J. G. A. KITCHEN & I. H. STOREY.
VARIABLE SPEED FRICTION GEARING.
APPLICATION FILED NOV. 25, 1912.
1,083,328.
Patented Jan. 6, 1914.
3 SHEETS—SHEET 1.
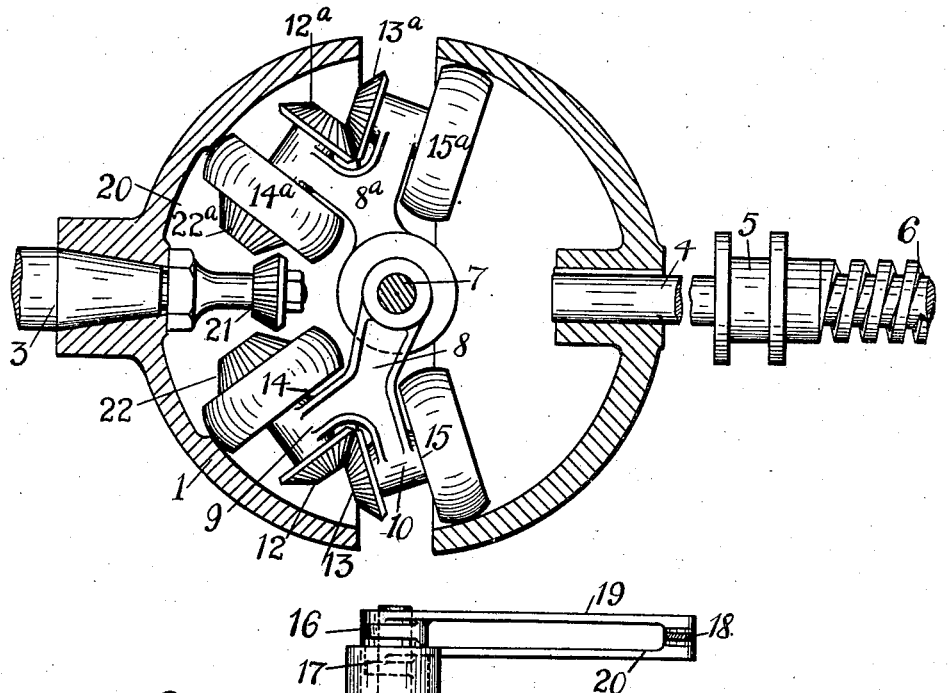
Fig. 1.
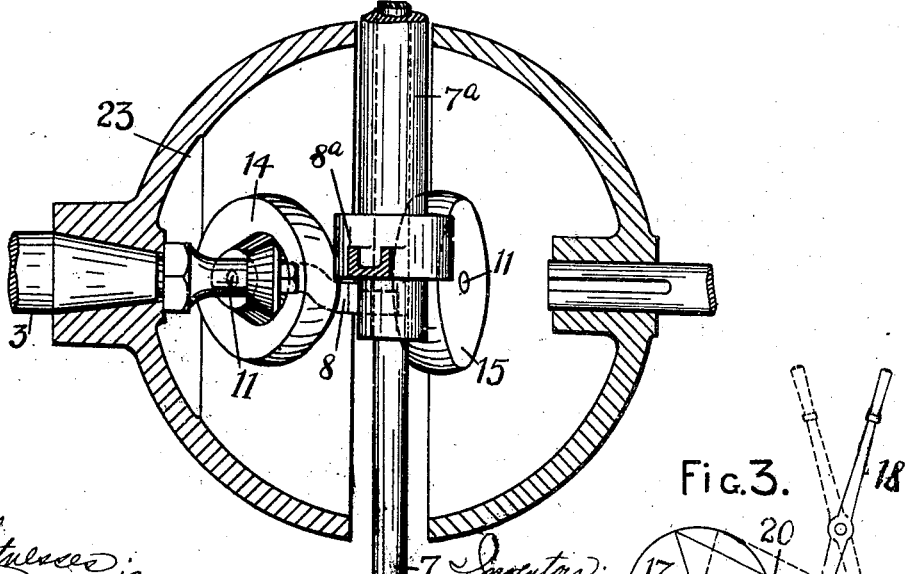
Fig. 2.
Fig. 3.

J. G. A. KITCHEN & I. H. STOREY.
VARIABLE SPEED FRICTION GEARING.
APPLICATION FILED NOV. 25, 1912.

1,083,328.

Patented Jan. 6, 1914.
3 SHEETS—SHEET 3.

UNITED STATES PATENT OFFICE.

JOHN GEORGE AULSEBROOK KITCHEN, OF LANCASTER, AND ISAAC HENRY STOREY, OF AMBLESIDE, ENGLAND.

VARIABLE-SPEED FRICTION-GEARING.

1,083,328.   Specification of Letters Patent.   Patented Jan. 6, 1914.

Application filed November 25, 1912. Serial No. 733,380.

*To all whom it may concern:*

Be it known that we, JOHN GEORGE AULSEBROOK KITCHEN and ISAAC HENRY STOREY, subjects of the King of Great Britain and Ireland, residing, respectively, at Lancaster, in the county of Lancaster, and Ambleside, in Westmoreland county, England, have invented certain new and useful Improvements in Variable-Speed Friction-Gearing, of which the following is a specification.

This invention relates to improvements in friction gearing of the variable velocity ratio type in which a revoluble hollow spherically surfaced body transmits motion at different velocities to another similar body by means of a movably mounted element carrying a friction wheel in contact with both surfaces.

According to our invention two opposed hollow spherically surfaced bodies independently mounted in axial alinement are employed, one of said bodies being longitudinally movable so as to maintain frictional pressure. The transmitting element carries two friction wheels driven together, one rolling in contact with one body, and one with the other. The transmitting element is pivotally mounted to turn on an axis which intersects the axis of the spherically surfaced bodies. A relatively reverse motion of the spherically surfaced bodies may be obtained by means of a suitable gear wheel or wheels on the driving body and gear wheels on the friction wheels nearest to it, the gear wheels being brought into engagement when desired.

The driven body preferably, is moved out of contact with the transmitting element against spring pressure in the known way.
The driven body may however be fixed in this respect, and the driving body be urged against it by spring pressure.

The transmitting element is preferably rocked on its axis so as to vary the points of contact of the friction wheels with the revoluble bodies by means of a hand lever which may also bring into operation the reverse gear.

The accompanying drawings show our improved friction gearing in three examples. The transmitting element and the friction wheels are shown duplicated in order to balance the pressure and to increase the contact surfaces.

Figure 4:
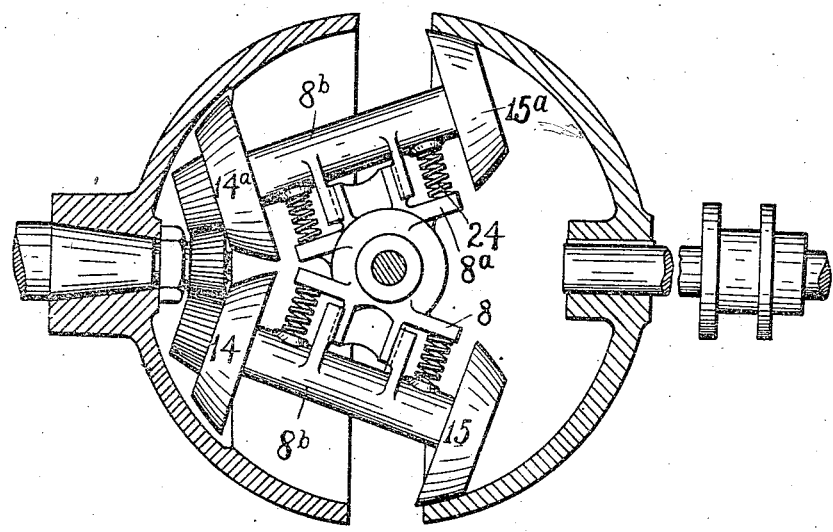

Figure 1 represents a longitudinal sectional elevation along a vertical plane; Fig. 2 a sectional view along a horizontal plane with one transmitting element removed; and Fig. 3 an elevation of hand operating means for varying the velocity of the driven body at will; Fig. 4 a longitudinal sectional elevation of a modified construction of the gear and Fig. 5 a sectional view of the same along a horizontal plane; Fig. 6 a vertical section of an arrangement with only one transmitting element.

Figs. 1 to 3, will be first referred to. In this example the driving and driven bodies 1 and 2, have each an internal active surface spherically curved in every direction radially, the internal surface of each approximating a hemisphere. The driving body 1 is fixed to the motor or driving shaft 3, and the driven body is fixed to a sliding shaft, 4, provided with a grooved shipping collar 5 behind which is a compression spring 6, which abuts at its outer end against a thrust bearing longitudinally fixed, not shown in the drawings. The shaft 4, between the shipping collar 5, and the driven body 2, will be supported in a long bearing not shown, adapted to permit the shaft to slide a short distance sufficient for the purpose of disengaging the body 2 from the friction rollers.

Centrally mounted between the bodies 1 and 2; and their spherical surfaces is a rocking shaft or bearer element 7, carried in fixed bearings not shown in the drawings but which may be located immediately outside the two bodies. The shaft 7 has a bracket 8, fixed or keyed to it and formed with bearings 9 and 10, set with their axes at right angles to one another. Each bearing carries a short shaft 11, at the adjacent ends of which are fixed bevel wheels 12 and 13, in engagement, and on the outer ends friction wheels 14 and 15, sufficiently large in diameter to roll in contact with the spherical faces of the driven bodies. Spring pressure suitably applied and not shown in the drawings may insure efficient contact between the friction wheels 14 and 14ª, and the body 1. It will be seen that with this arrangement, the body 2, will be driven in the same direction as the driving body 1.

In order to obtain more efficient contact, the transmitting element is duplicated, the duplicated parts being indicated respectively at 8ª, 12ª, 13ª, 14ª, and 15ª. The bracket 8ª, is fixed to a sleeve 7ª, loose on the shaft 7.

The friction wheels 14, 14ª, 15, and 15ª, may be traversed over the face of the bodies 1 and 2, so as to vary the ratios of the driving and driven surfaces in contact by any suitable known means. It is proposed to fix arms 16 and 17, see Fig. 3, to the shaft 7, and sleeve 7ª, respectively and connect the free ends of the arms to a hand lever such as 18 by means of links 19 and 20, a notched sector not shown, being used in the usual way.

The direction of motion for the driven body 2, may be reversed in the following way that is to say:—On the motor shaft is fixed a bevel wheel 21, and corresponding bevel wheels 22 and 22ª, are fixed to the friction wheels 14 and 14ª, respectively. The body 1 is recessed around the center as shown at 23, sufficiently deep to prevent contact of the friction wheels with the surface thereof when the brackets 8 and 8ª, are pushed over until the bevel wheels 22, 22ª, and 21 come into gear.

Figure 5:
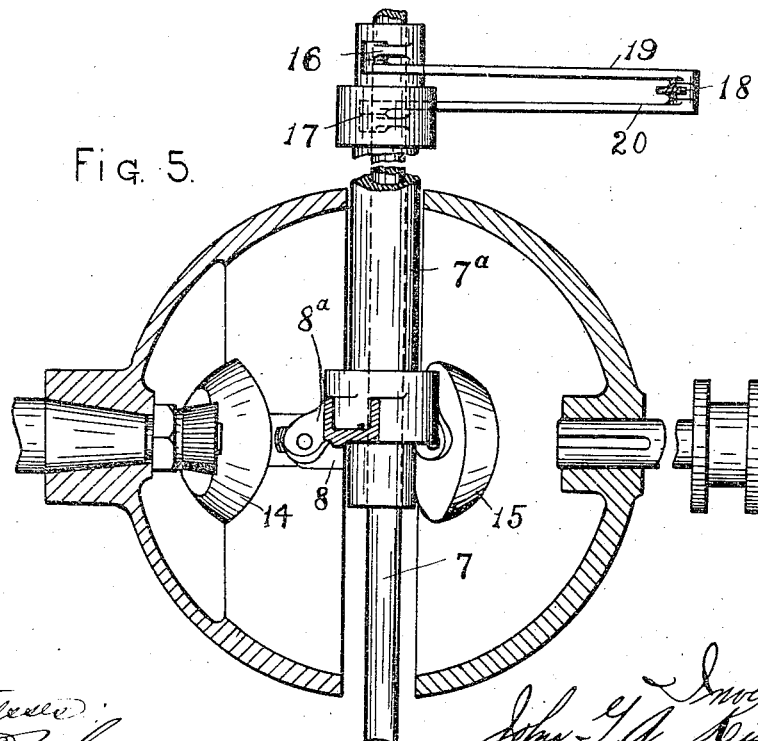
Figure 6:
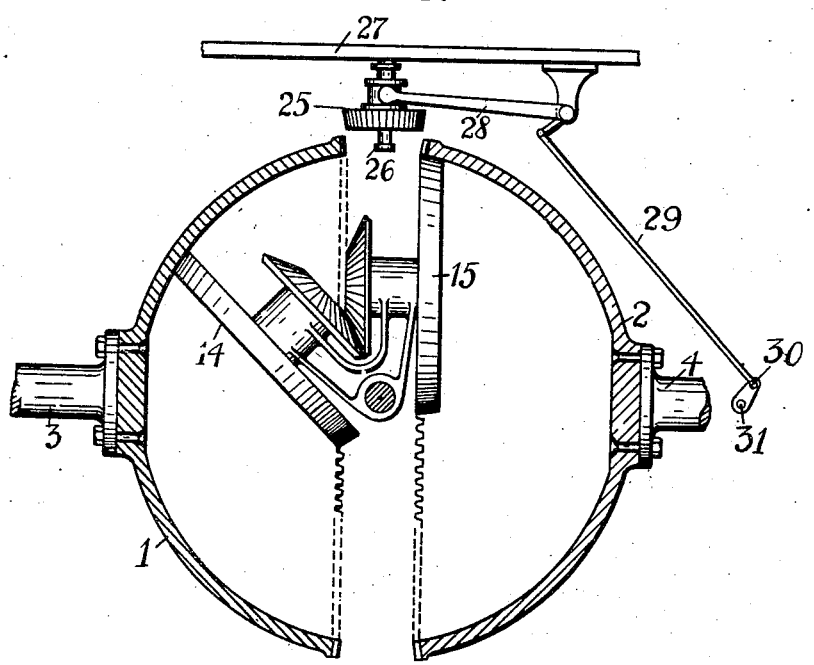

Figs. 4 and 5 will now be referred to. Similar parts are indicated by similar reference numbers and letters to those shown in Figs. 1 to 3. In this modification each pair of friction wheels 14 and 15, and 14ª, and 15ª, are mounted on the same axis, the peripheries of the wheels being spherical and of the same curvature preferably as that of the driving and driven bodies 1 and 2 respectively. The friction wheels are shown pressed against the contact surfaces of the driving and driven bodies by means of the spring arrangement shown. Each bracket 8 and 8ª, has a radially sliding upper or bearing part 8ᵇ, springs 24 being disposed between the two parts so as to force them outward and thereby insure efficient adhesion. Any suitable means or arrangement may be provided for this purpose in either example of the gear.

Fig. 6 represents an arrangement of the gearing with only one transmitting element of the kind shown in Fig. 1, which allows friction pulleys 14 and 15 of larger diameter to be used and a somewhat greater variation in the speed to be obtained. With this arrangement however the reversing gear shown in Figs. 1 and 4 cannot be used, but some other arrangement has to be employed for this purpose, for instance the one represented in Fig. 6. The two hemispherical bodies 1 and 2 are provided with bevel teeth on their edges, and a bevel wheel 25 is arranged capable of sliding on a stud 26 fixed to a stationary rail 27. The wheel 25 can be moved into and out of gear with the hemispherical bodies when the driven sliding body 2 is moved back out of contact with the friction pulley 15, by means of a bell-crank shipping lever 28 connected by a link 29 to a lever 30 on a shaft 31, which can be turned by means of any suitable connections by a lever within reach of the driver. The bevel wheel 25 may be duplicated on the opposite side. Obviously this arrangement may also be used with a transmitting element of the kind shown in Figs. 4 and 5. Or instead of this reversing arrangement one of the shafts may be cut and one part connected to the other by the usual train of spur wheels and shifting gear so as to drive both parts either in the same or in opposite directions. This arrangement may of course also be applied to the arrangements of the gearing represented in Figs. 1 and 5, and the bevel wheels 21, 22 and 22ª for reversing omitted.

We claim as our invention:

1. In a variable speed friction gearing the combination of two opposed concave rotatively alined bodies whose internal surfaces each form part of a hemisphere, shafts therefor, one of which shafts is movable in its axial direction, a transmitting element comprising two friction wheels rotating in unison and each in contact with the interior surface of one of said concave bodies when these are forced toward each other, an element carrying said friction wheels and movable around an axis transverse to the axis of said shafts, and means for moving the said carrying element around its axis and thereby varying the angle of the transmitting element with the axis of said shafts and the points of contact of the friction wheels with the concave bodies.

2. A variable speed friction gearing comprising in combination two relatively alined bodies having opposed cavities forming parts of an internal spherical surface, shafts therefor, one of which shafts is longitudinally stationary and the other movable, a carrier movable around an axis transverse to the axis of said shafts, two friction wheels revolubly mounted on said carrier and one driving the other, one of which wheels is in contact with the longitudinally stationary concave body and the other with the movable one, and means for turning the said carrier around its axis.

3. A variable speed friction gearing comprising in combination an axially stationary driving shaft and an axially movable driven shaft in alinement with each other, means for forcing said driven shaft toward and away from the driving shaft, two concave bodies fixed one on each of said shafts, the internal surfaces of which form part of a sphere when the shafts are forced together, a carrier movable around an axis tratsverse to that of said shafts, and means for turning it around said axis, two friction pulleys mounted on said carrier one of which is in contact with the concave body on the driving shaft and drives the other friction wheel in contact with the cavity on the driven shaft, a bevel wheel fixed on the end of the driving shaft, another bevel wheel fixed to the friction pulley in contact with the driving concave body and adapted to gear with the first said bevel wheel, said driven body having a cavity opposite the rim of the last said friction wheel when the said bevel wheels are in gear with each other.

4. A variable speed friction gearing comprising in combination, driving and driven bodies having internal spherically shaped friction faces, friction wheels disposed in said bodies and operatively connected with each other in driven relation and one engaging each body to transmit motion from one to the other, and means for shifting said wheels with respect to said bodies to vary the speed of one body with respect to the other, substantially as described.

5. A variable speed friction gearing comprising in combination, opposed driving and driven bodies having spherically shaped friction faces and adapted to be moved toward or from each other, friction wheels operatively connected with each other in driven relation and one engaging each body to transmit motion from one to the other, means for shifting said wheels with respect to said bodies to vary the speed of one body with respect to the other, substantially as described.

6. A variable speed friction gearing comprising in combination, alined driving and driven bodies having spherically shaped internal friction faces, mechanism in said bodies comprising friction wheels geared to each other and one engaging one body and another the other body to transmit motion from the driving to the driven body in the same direction, and means for disengaging one of said wheels from said driving body and connecting said mechanism for positive drive with said driving body to reverse the movement of said driven body, substantially as described.

In testimony whereof we have signed our names to this specification in the presence of two subscribing witnesses.

JOHN GEORGE AULSEBROOK KITCHEN.
ISAAC HENRY STOREY.

Witnesses:
JAMES CRUICKSHANK,
JAS. H. SHEPHERD.